United States Patent [19]

Norris

[11] Patent Number: 5,691,505

[45] Date of Patent: Nov. 25, 1997

[54] ELECTRIC CABLE TERMINATION GLAND

[75] Inventor: Trevor William Norris, Ashton-under-Lyne, England

[73] Assignee: Hawke Cable Glands Limited, England

[21] Appl. No.: 667,440

[22] Filed: Jun. 21, 1996

[30] Foreign Application Priority Data

Jun. 24, 1995 [GB] United Kingdom ............... 9512939

[51] Int. Cl.⁶ ........................................................ H02G 3/18
[52] U.S. Cl. ............................ 174/51; 174/65 SS; 439/98; 439/394
[58] Field of Search ........................... 174/65 SS, 51; 285/158, 161, 340; 439/98, 108, 394, 583, 584

[56] References Cited

U.S. PATENT DOCUMENTS

| | | |
|---|---|---|
| 1,345,473 | 7/1920 | Benjamin . |
| 1,699,690 | 1/1929 | Dake ................................ 174/65 SS X |
| 3,985,418 | 10/1976 | Spinner ............................. 339/177 R |
| 4,198,537 | 4/1980 | Mariani ................................ 174/51 X |
| 4,273,405 | 6/1981 | Law .................................. 174/65 SS X |
| 4,515,991 | 5/1985 | Hutchison ............................ 174/65 SS |
| 4,692,562 | 9/1987 | Nattel ................................ 174/65 SS |
| 4,739,126 | 4/1988 | Gutter et al. ........................ 174/65 SS |
| 4,814,547 | 3/1989 | Riley et al. .......................... 174/65 SS |
| 5,278,352 | 1/1994 | Schade ................................ 174/65 SS |

FOREIGN PATENT DOCUMENTS

| | | | |
|---|---|---|---|
| 430356 | 6/1935 | United Kingdom ................ 285/256 X |
| 1361492 | 7/1974 | United Kingdom ........... 174/65 SS X |
| 2234306 | 1/1991 | United Kingdom ................ 285/340 X |

Primary Examiner—Hyung S. Sough
Assistant Examiner—Dean A. Reichard
Attorney, Agent, or Firm—Larson and Taylor

[57] ABSTRACT

An electric cable termination gland has a continuity member formed by a metal sleeve which is located within the gland and has a middle region of reduced strength formed by a series of discrete bridge portions with a partially folded crease creating a central zone about which the bridge portions can fold inwardly when axial pressure is applied to the continuity member to cause the bridge portions to contact an exposed metal sheath of a cable extending through the gland.

16 Claims, 7 Drawing Sheets

ELECTRIC CABLE TERMINATION GLAND

BACKGROUND OF THE INVENTION

This invention relates to an electric cable termination gland and to a method of assembling same.

The invention has particular application to glands for electric cables that have metallic sheathing or armour metal cladding and that require to be assembled and fitted to ensure electrical continuity for earthing (grounding) between the sheathing or cladding and the electrical equipment at which the cable terminates.

As is well known, cables are made to various sizes and types, and there are different forms and configurations of the metal claddings and/or armour sheathings that have to be accommodated in the assembly and use of cable glands. There are metal claddings or armour sheathings of various types including continuous, convoluted, corrugated, interlocking, woven or helically wound.

Generally, these types or cables are referred to as metal clad, but it should be appreciated that such cables also commonly have an outer protective covering or jacket to protect the cable, and such jackets or covering may be of any suitable material. The cables are made to different sizes with different numbers Of conductor cores, and termination glands have to be made to a range of different sizes. In addition, there are different types of such cable glands.

Some cable glands used for termination of electric cables are of the type including a barrier which prevents the ingress of liquid, gas or solids into the interstices of the cable and the space between the cable cores when the cable sheathing has been removed to allow connection of the cable conductors to some electrical equipment. The barrier is commonly provided by a compound which is used to fill the interstices and space between the cable cores within the gland assembly. The filler compound can be a hot melt composition which sets on cooling or it can be e an epoxy or like resin that is mixed or used when having a "putty" consistency and which hardens later when the gland is assembled. The gland may be designed especially for such use of the compound to provide the barrier, and such glands have been developed previously by the Assignee of this Application, for example as described in UK Patents Nos. 1528347 and 1528348.

Other cable glands do not include such barrier, but when assembling a barrier or an ordinary non-barrier type of gland to the terminating end of the cable, the electrical continuity and clamping of the metal cladding is critical.

SUMMARY OF THE INVENTION it is an object of this invention to provide improvements in electric cable termination glands for metal clad cables to ensure electrical continuity.

It is a further object of this invention to provide an electric cable termination gland of special form and construction for use with various types of metal clad cables having metallic sheathing or armour cladding including sheathing or cladding of the convoluted or helical kind.

It is another object or this invention to provide an electric cable termination which is simple to assemble whilst providing electrical continuity.

Other objects of this invention are to provide a method of assembling an electric termination gland to ensure electrical continuity as well as providing an improved electric termination gland which is of simple construction and easy to use in hazardous or difficult site locations.

According to this invention, there is provided an electric cable termination gland comprising an entry component for connection to electrical equipment, a middle nut to engage with the entry component and a tail nut to engage with the middle nut, a continuity member located inside the middle nut and engaging an abutment therein, and the entry component having an end abutment received inside that end of the middle nut remote from the tall nut with the continuity member also engaging said end abutment, the continuity member having a middle region of reduced strength provided by a series discrete bridge portions separated by spaced apart apertures, the arrangement being such that on tightening the middle nut on the entry component when en electric cable extends through the gland with the metal cladding being exposed within the middle nut, the continuity member is subject to axial pressure and the region of reduced strength folds inwardly whereby the bridge portions are displaced towards the metal cladding and on engagement with the metal cladding provide at least one electrical continuity contact.

By this invention, the gland has the special arrangement with the continuity member which is seated within the middle nut, and on tightening the assembly of the middle nut onto the entry component, the continuity member reacts to the axial pressure so that contact with the metal cladding is produced by the displacement of the bridge portions. This provides a distinct improvement as the displacement of the bridge portions arises during simple assembly of the gland to the electric cable and no special tools or electrical connectors are required to ensure electrical continuity for grounding to the electrical equipment to which the termination is being connected.

Preferably, the continuity member is made of a highly conductive metal such as copper or an alloy thereof. The metal may also be steel or aluminium. The metal may be plated or coated such as with zinc, nickel or copper.

Additionally, it is preferred that the continuity member is formed from a strip which is rolled to form a sleeve or ring-like continuity member.

By these preferred features, the continuity member is of high electrical conductivity, and can be made in a simple manner to fit a wide range of gland sizes.

The apertures may be of different shapes and configurations and designed so that the discrete bridge portions are arranged to provide a plurality of spaced apart contacts to engage the metal cladding of the cable in use.

In a preferred form of continuity member, the strip is provided with a central creasing about which the bridge portions are designed to fold when the axial force is applied to the opposed ends of the member.

The apertures may be elongate so as to extend between opposed ends of the continuity member. Each end of the continuity member may be strengthened by a peripheral upstand or rolled edge.

This invention is also directed to the continuity member for use in an electric cable termination gland.

The cable gland may be of the barrier type with a compound pot received within the entry component and a rear pot also located in the entry component with the cores extending through the entry component with the barrier compound being received within the compound pot and rear pot.

The cable gland may be of the non-barrier type with the entry component locating a stop washer end spacer sleeve with which the exposed end of the metal cladding of the cable are engaged.

According to another aspect of this invention, there is provided a method of assembling electric cable termination glands of both types as aforementioned and comprising the steps of locating the tail nut and associated seal and washer on the cable, mounting the middle nut on the cable in the region where the metal sheathing is exposed with the conductor cores extending through the entry component, locating the continuity member inside the middle nut and engaging the middle nut with the entry component so that the continuity member engages the respective internal abutments on the entry component and the middle nut, and tightening the middle nut on the entry component causing the continuity member to be subject to axial forces causing the folding displacement of the bridge portions to bring these into electrical contact with the exposed metal cladding.

This method of assembly is simple end safe and can be completed easily and quickly.

Other features and advantages achieved by this invented electric cable termination gland will be described later herein with reference to the following description of exemplary embodiments of the invention depicted in the accompanying drawings.

DETAILED DESCRIPTION OF THE EXEMPLARY EMBODIMENTS

With reference to the first embodiment of the invention of a barrier cable gland as shown in FIGS. 1,2,3 and 3A, the component pads of the cable gland termination comprise an entry component 1, a middle nut 2 end a tall nut 3. The gland further comprises a compound pot 4 and a rear pot 5 which provide the enclosure for confining the barrier compound as explained later and as shown FIGS. 3A and 3B. A continuity member 6 is associated with the entry component 1 and the middle nut 2. A rear seal 7 and washer 8 are associated with the tail nut 3.

Figure 3:
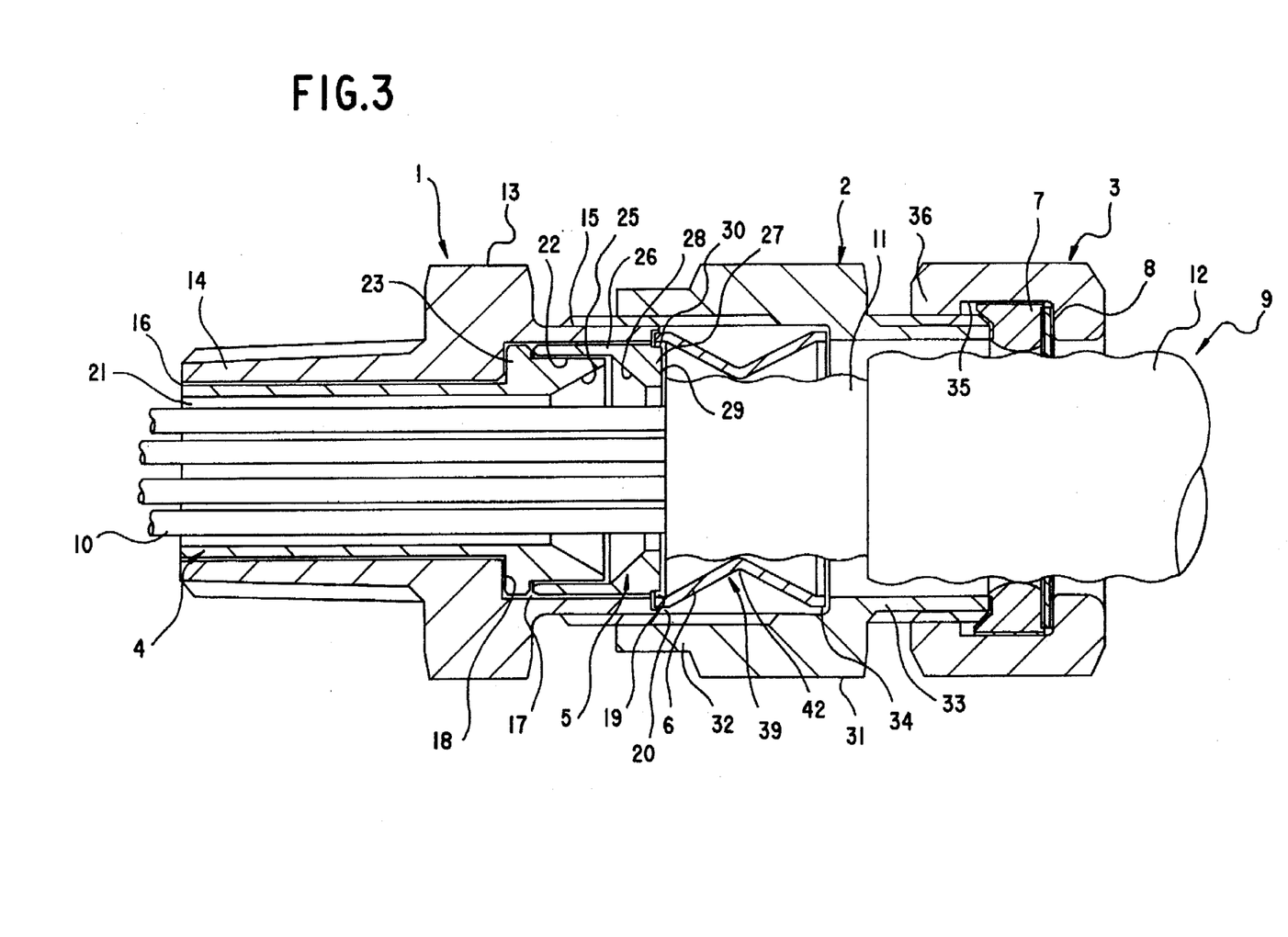
FIG. 3 is a longitudinal sectional view of the assembled barrier cable gland termination shown in FIGS. 1 and 2 including an armoured cable but excluding for clarity the barrier compound.
Figure 3A:
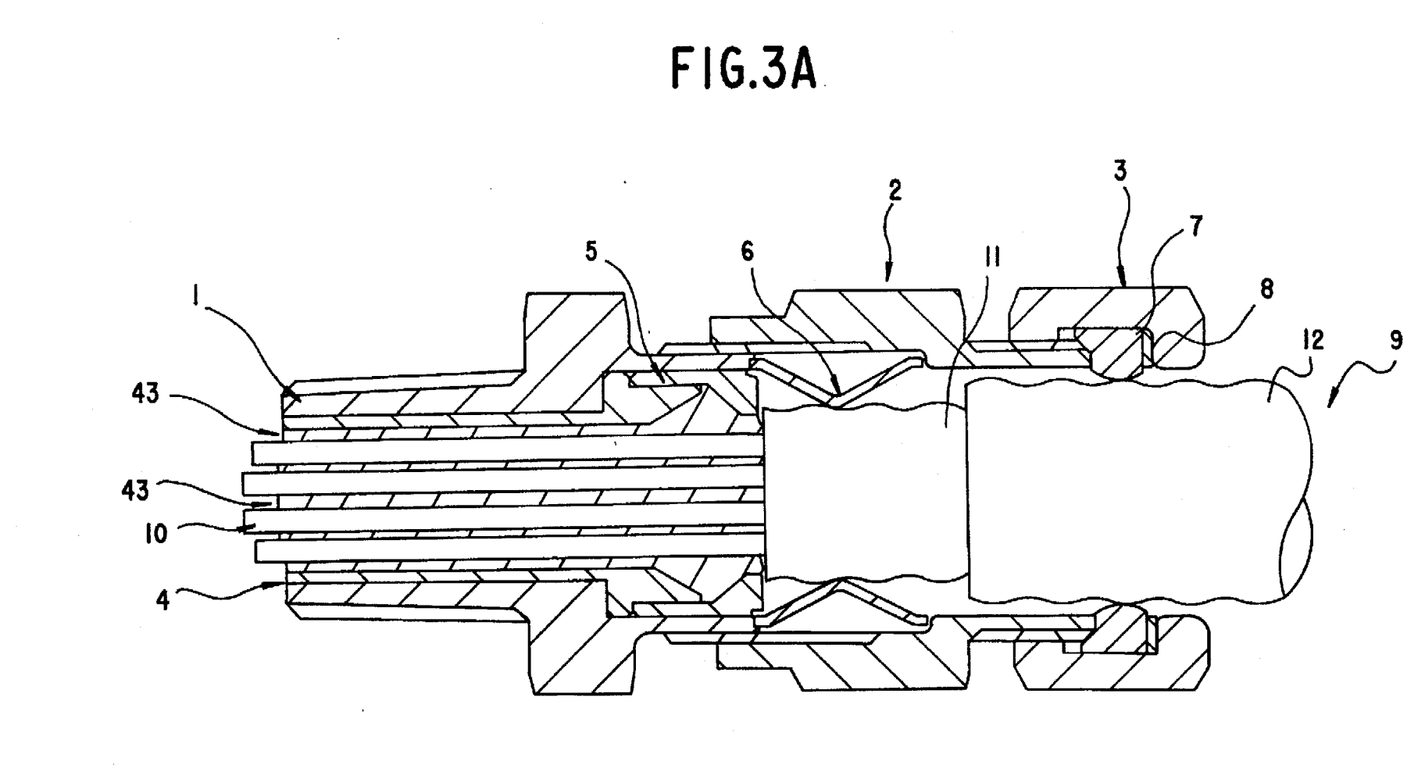
FIG. 3A is a view similar to that of FIG. 3 but showing the assembled gland with the barrier compound in situ.

As shown in FIGS. 3 and 3A, the metal clad cable 9 comprises a plurality of conductor cores 10, an armoured metal sheath 11 of the helically wound type and an outer jacket 12 of any suitable material. In known manner, the terminal end of the cable 9 is prepared so that the conductor cores 10 can be connected to electrical equipment (not shown). The ends of the cores 10 are exposed and cut to the required length by removal of a length of the jacket 12 and armour sheath 11, a prescribed length of the armour sheath 11 is exposed by further removal of the covering jacket 12. The cores 10 are separated and freed with any other packing or material being removed from around the cores 10.

Figure 1:
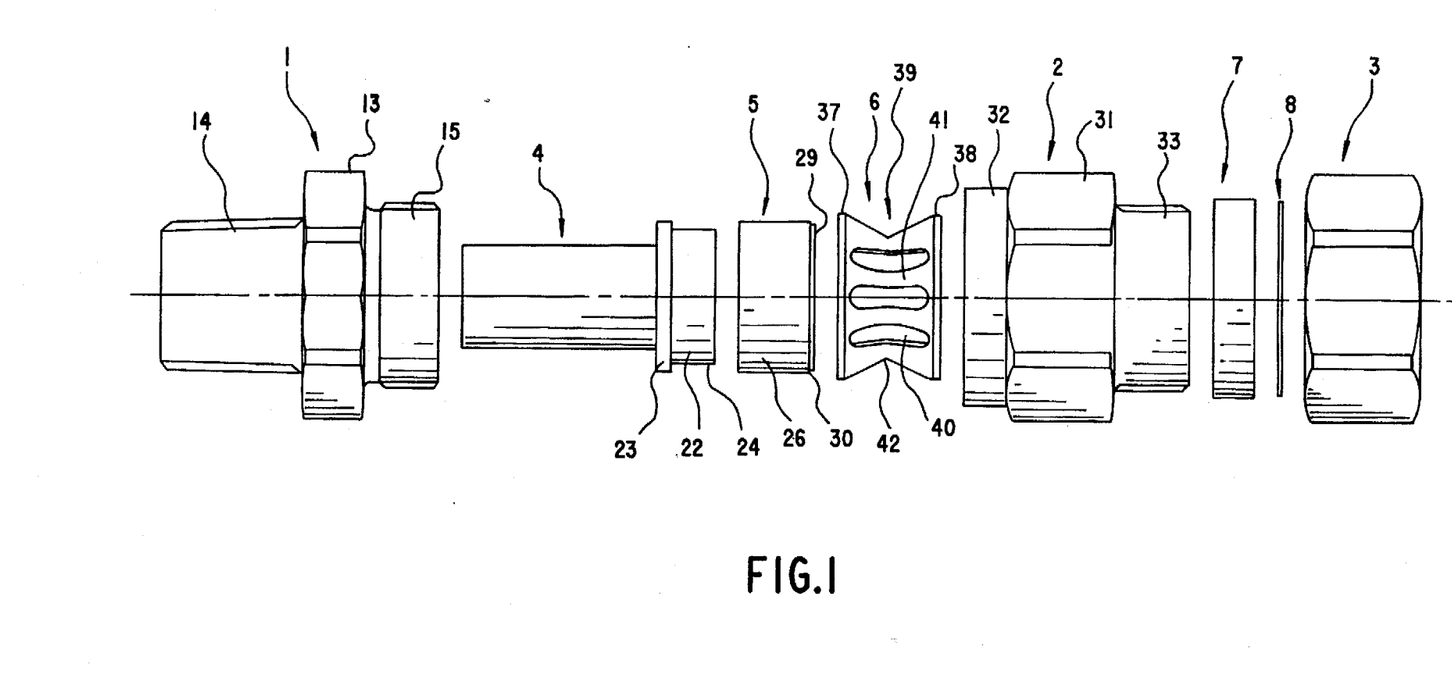
FIG. 1 is a exploded side view of the component parts of a barrier cable gland termination.
Figure 2:
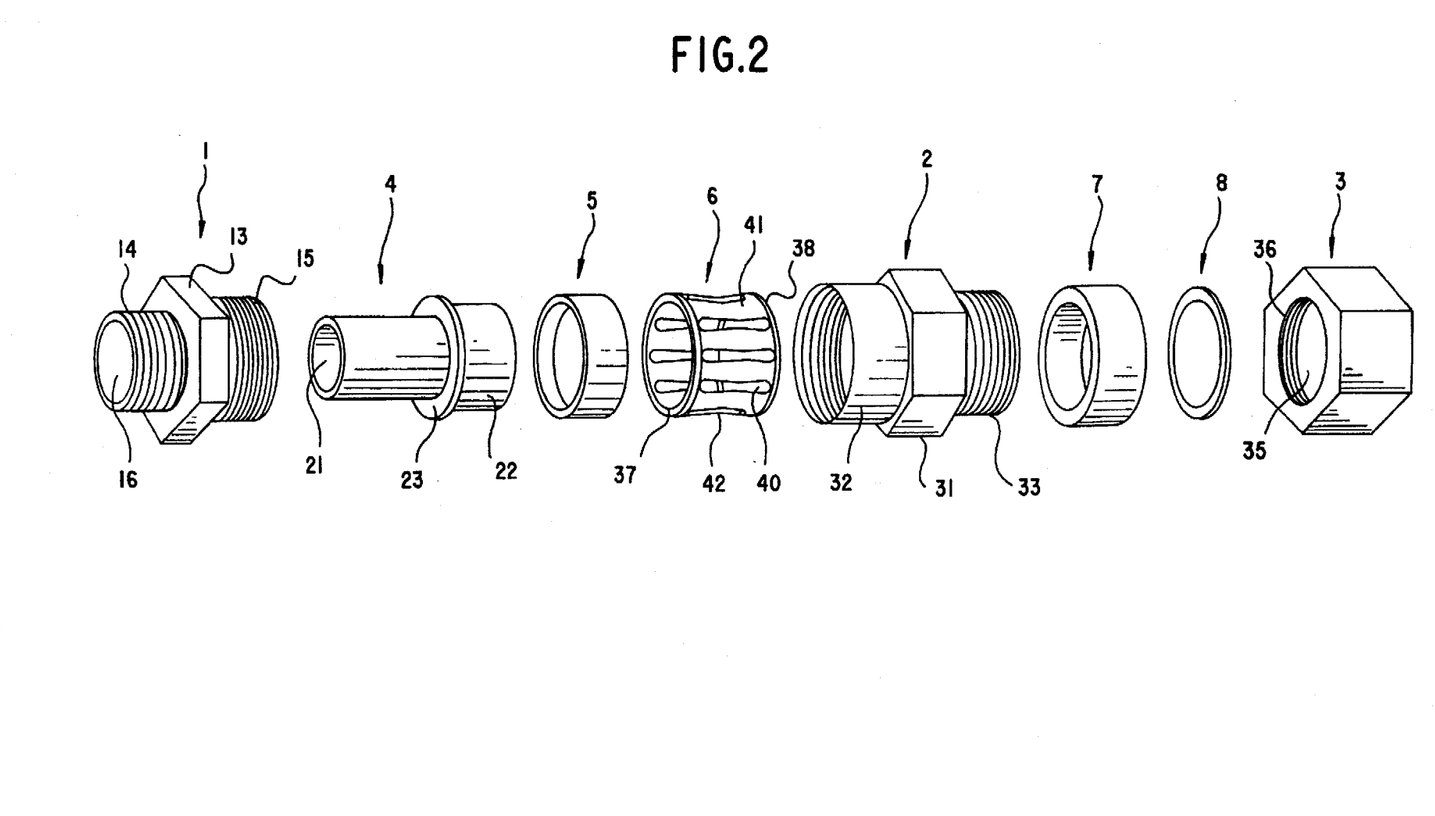
FIG. 2 is an isometric view of the component parts of the barrier cable gland termination shown in FIG. 1.

The entry component 1 comprises a hollow body having an outer flatted flange 13 for gripping the entry component in use, and the outer end portion 14 of the entry component 1 has an external thread for connection, for example, to the housing of the electrical equipment (not shown). The other end portion 15 of the entry component also has an external thread for engagement with the middle nut 2. The entry component 1 has a through bore 16 and there is a counter bore 17 at the inner end portion 15 providing an annular shoulder 18. The end face of the inner end portion 15 of the entry component 1 is stepped providing an inner annular abutment 19 and an outer annular rib 20.

In this barrier termination embodiment, the compound pot 4 is arranged to be seated within the entry component 1 to co-operate with the rear pot 5 also seated within the entry component 1 with the exposed cores 10 extending through the pots 4 and 5.

The compound pot 4 has a through bore 21 with the inner end portion 22 having an annular outer flange 23 arranged to abut the shoulder 18 of the entry component 1. Extending from the flange 23 there is a tapering inner end portion having a relieved outer annular face 24 and an inner taper face 25. The relieved annular face 24 of the pot 4 provides, in the assembly, an annular clearance between the inner end of the entry component 1 and the compound pot 4 for receiving one annular end portion 26 of the rear pot 5. The other end of the rear pot 5 has an inwardly directed flange 27 having a taper face 28 and a radial end face 29 with a small peripheral relief groove 30. Generally, the radial end face 29 of the rear pot 5 is aligned with the inner abutment 19 on the end face of the entry component 1.

The middle nut 2 has a hollow body having a through bore with an external flatted flange 31 for use in gripping the middle nut. One end portion 32 nearest the entry component 1 is internally threaded to engage the externally threaded end portion 15 of the entry component 1. The other end portion 33 extending from the flange 31 has an external thread for engagement with the tail nut 3. The end portion 32 is counter-bored along a substantial axial length of the nut body providing an inner shoulder abutment 34.

The tail nut 3 is of hexagonal or like nut form with flats externally, and has an inner annular recess 35 in which are seated the rear seal 7 and washer 8. The tail nut 3 has an internal threaded end portion 36 arranged to engage over the externally threaded end of the middle nut 2. The rear seal 7 is of suitable resilient material and is arranged to engage the outer jacket 12 of the cable. The seal 7 is arranged to be engaged by the extreme end face of the end portion 33 of the middle nut 2.

The continuity member 6 is the component in the gland arranged to provide the electrical continuity from the metallic armoured metal sheath 11 and the gland to the electrical equipment. The member 6 comprises a conductive metal ring-like sleeve made of sheet or relatively thin material with the sleeve having a major external diameter to fit inside the middle nut counter bore. Preferably the continuity member 6 is made of copper or a highly conductive copper based alloy. The continuity member 6 has axially opposed circular abutment ends 37, 38 which are respectively arranged to engage the inner abutment 19 of the entry component 1 and the opposed axially spaced inner shoulder abutment 34 of the middle nut 2 so that the member 6 is trapped there between and on relative threaded engagement and tightening of the middle nut 2 on the entry component 1, the member 6 is squeezed end subject to axial pressure.

The continuity member 6 has a middle portion 39 which is formed with a series of radially spaced apart elongate apertures 40 that extend generally in an axial or longitudinal direction and which are designed to locally reduce the strength of the middle portion 39 by leaving a series of bridge portions 41 that extend across the middle portion whilst being anchored respectively to the opposed abutment ends 37, 38. The central part of the middle portion 39 is formed with a partially folded crease 42 extending around the member 6 across all of the bridge portions to create a central zone about which the member 6 will initially fold or collapse when axial pressure is applied to the respective abutment ends 37,38. On such axial pressure, the bridge portions 41 will be displaced inwardly towards the metal sheath 11 and provide one or more discrete contact points engaging and in electrical contact with the metal sheath 11.

As will be appreciated, as the peripheral configuration of the metal sheath may be non-cylindrical and convoluted, the bridge portions 41 will be displaced on the axial compression of the continuity member until brought into engagement with the surface of the metal sheath 11, but by applying slightly more axial compression by rotating the middle nut slightly more on the entry component 1, further compression will ensure that the bridge portions are extended inwards to be brought into full contact with the metal clad surface at areas where irregularities or non-conformities arise.

With reference now to FIG. 3A this shows the barrier gland assembly as just described including the barrier compound 43 in situ being within the compound pot 4 and the co-operating rear pot 5 with the compound filling all of the space and interstices between the conductor cores 10 and filling such space up to the end face of the armoured metal sheath 11 which lies closely to the radial end face 29 of the rear pot 5.

Figure 4:
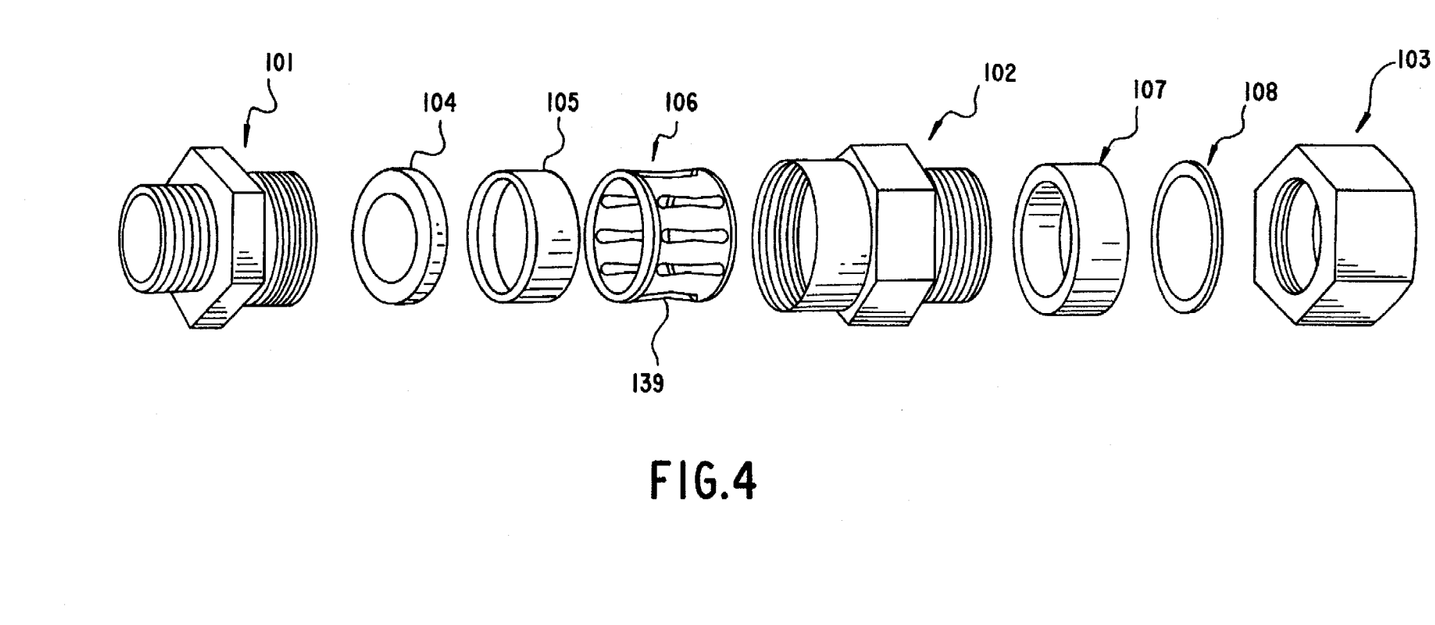
FIG. 4 is an isometric view of the component parts of a cable gland termination of the non-barrier type.
Figure 5:
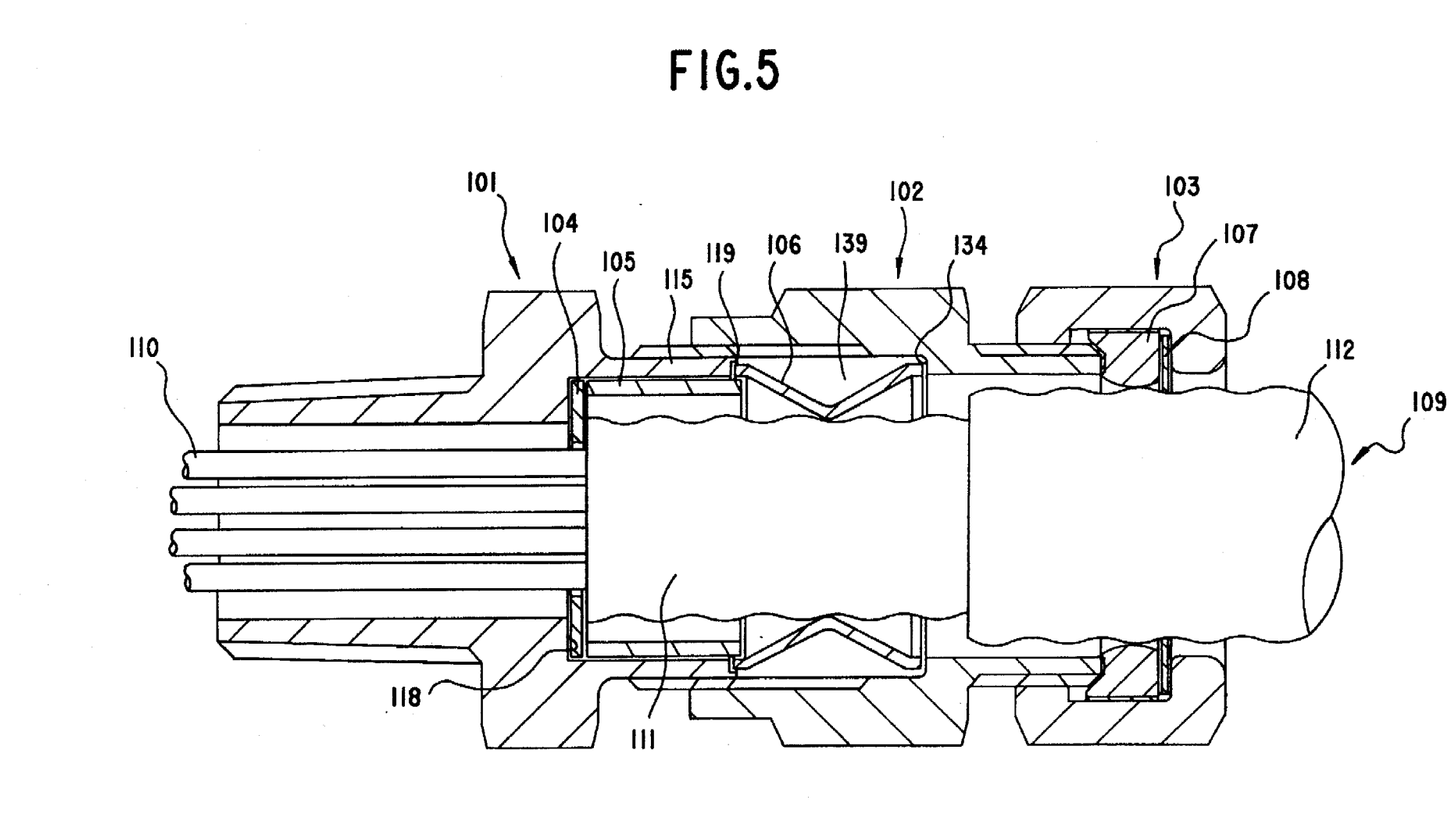
FIG. 5 is a longitudinal sectional view of the assembled cable gland termination shown in FIG. 4 including an armoured cable.

With reference to the non-barrier cable gland according to this invention as shown in FIGS. 4 and 5, this is similar in principle to the barrier cable gland and the following descriptio is only given in brief.

The gland comprises an entry component 101, a middle nut 102, a tail nut 103 with associated seal 107 and washer 108. The entry component 101 and the middle nut 102 are of the same design as in the first embodiment, and a continuity member 106 is seated within the middle nut being located on the inner shoulder abutment 134 and engages the inner annular abutment 119 or the entry component 101. However, instead of the compound pot and rear pot, there Is a stop washer 104 seating against the inner annular shoulder 118 of the entry component 101 with a spacer sleeve 105 extending internally of the inner end portion 115 of the entry component 101. The stop washer 104 engages with the cut end of the armour sheath 111 so as to prevent this being pulled through the gland. The conductor cores 110 extend from and through the stop washer 104 through the open inner end of the entry component 101 for connection to electrical equipment (not shown).

In a similar manner as previously described, the cable gland of this embodiment is used after the preparation of the terminal end of the cable 109 by which the jacket 112 is removed to expose the metal cladding 111 and this is then cut back to leave the lengths of conductor cores 110 free and separated for connection. The tail nut assembly 103 with washer 108 and seal 107 is slid over the cable 109 followed by the middle nut 102, and the entry component 101 may be fitted to the electrical equipment with the armour stop washer 104 and spacer sleeve 105 received within the counter bored inner end 115 of the entry component. The continuity member 106 is pushed over the exposed armour sheath 111 so one abutment end engages with the internal abutment 134 of the middle nut 102.

The cable 109 is pushed through the entry component 101 until the cut end of the armour sheath is brought into engagement with the stop washer 104. At this position and on engagement of the threaded portions of the entry component 101 with the middle nut 102, the other abutment end of the continuity member 106 engages with the annular abutment face 119 of the entry component. On tightening the middle nut 102, the continutity member 106 is subject to axial compressive forces causing the middle portion 139 of reduced strength to fold inwardly so that the bridge portions engage with the outer surface of the armour sheath 111 to ensure electrical contact.

To finish the assembly, the tail nut assembly 103 is engaged with the middle nut 102 and tightened so that the seal 107 is brought into firm engagement with the jacket 112 of the cable.

For the same reasons as explained previously, the deformed bridge portions of the continuity member make more than one good firm electrical contact with the external surface of the armour sheath despite the non-conformities in the surface of the metal cladding.

In the two embodiments of the cable glands as just described, the continuity member is the same but other forms of continuity members can be provided.

The apertures which are spaced around the member can be of different shapes, and the spacing to define the bridge portions can be varied depending on the thickness and/or strength of the metal used and the degree of reduced strength required to obtain the required folding and deformation on axially applied loads.

The continuity member is preferably made from a strip of metal which is stamped and creased as required, and then rolled to form the ring-like continuity member of the required diameter for a particular size of gland.

Figure 6A:
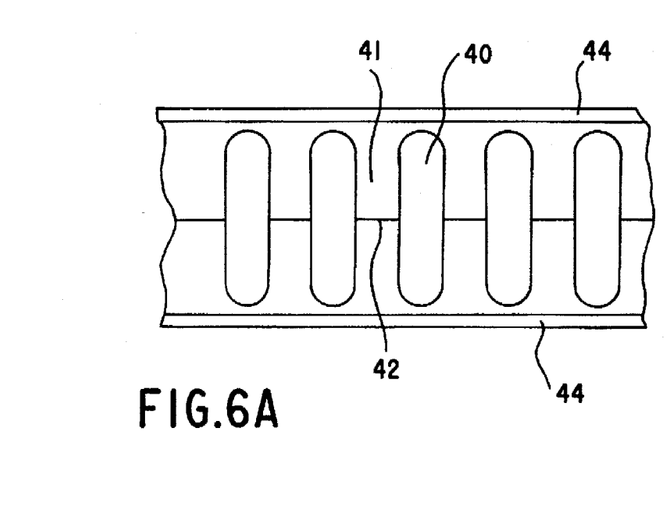
FIGS. 6A–D depict various forms of the developed strip from which the continuity member is formed.

With reference to FIGS. 6A–D, this shows the strip development (in plan view) for forming a continuity member as just described. FIG. 6A shows the form of the apertures 40 for the continuity member shown and described in the two embodiments previously described. The apertures 40 are regularly spaced apart and are of elongate form with part-circular ends leaving the bridge portions 41 of strap-like form extending between the edges 44 of the strip. These edges 44 provide the opposed abutment ends of the continuity member and may be rolled or upset to increase their strength. Along the centre line of the strip, there is the linear creasing 42 defining the centre zone about which the bridge portions 41 are designed to fold.

Figure 6B:
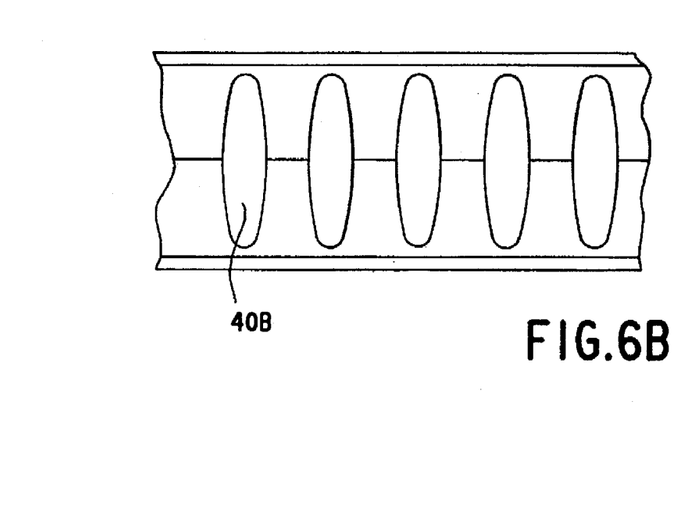
Figure 6C:
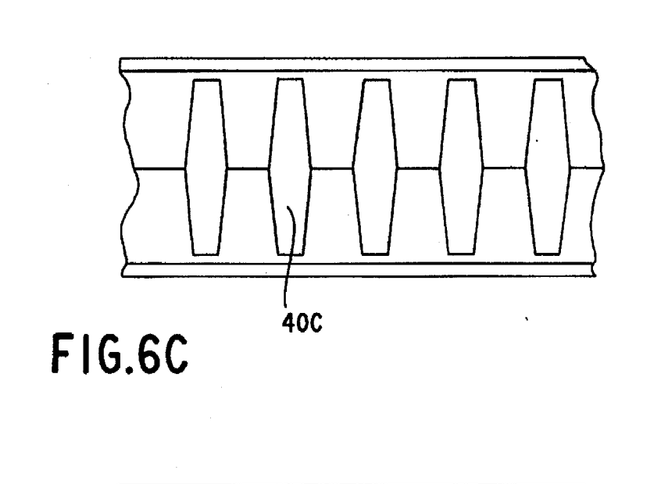
Figure 6D:
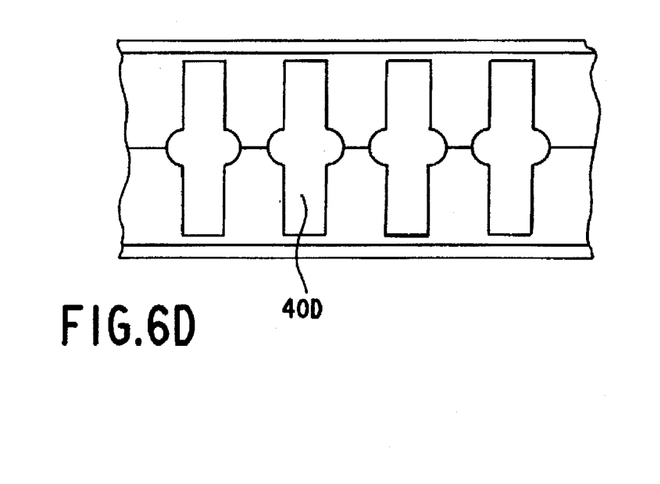

FIG. 6B shows a strip in which the apertures 40B are of long oval form. FIG. 6C shows a strip in which the apertures 40C are of lozenge shape and FIG. 6D shows another variant in which the apertures 40D have a generally rectangular shape with opposed part-circular extensions in the central region. In each of these variants, the creasing extends along the centre-line of the strip so that the bridge portions will fold along such crease line.

Other forms and shapes of apertures may be provided whilst not departing from the concept of providing these spaced apart plurality of bridge portions that are deformed to provide the plurality of discrete contacts to engage with the metal sheath.

To those familiar with the construction and assembly of such termination cable glands, the simplicity of the continuity member and the resultant formation of the continuity contact on assembly and tightening of the gland components will be appreciated. The continuity member can be made to a wide range of sizes to suit different sizes of glands as are required for different sizes of cables. The same type of continuity member can be used for a wide range of metal clad cables whilst still ensuring proper electrical contact for grounding (earthing) requirements.

According to another aspect of the invention, there is provided an electric cable termination gland comprising a continuity member located within the gland between axially spaced internal abutments, the continuity member having a zone of reduced strength arranged to fold inwardly to contact exposed metal cladding of a cable extending through the gland in response to relative axial movement of the abutments to apply pressure to the continuity member.

According to yet another aspect of the invention, there is provided a continuity member for an electric cable termination gland comprising a series of discrete bridge portions separated by spaced apart apertures to form a region of reduced strength capable of deforming in response to axial pressure applied to the continuity member to contact exposed metal cladding of a cable extending through a gland in which the continuity member is located.

I claim:

1. An electric cable termination gland comprising an entry component for connection to electrical equipment, a middle nut to engage with said entry component and having an abutment shoulder therein, a tail nut to engage with said middle nut, said entry component having an end abutment received inside an end of said middle nut remote from said tail nut, and a continuity member located inside said middle nut between said abutment shoulder and said end abutment, said continuity member having two opposed ends and a middle region of reduced strength provided by a series of discrete bridge portions separated by spaced apart apertures such that tightening said middle nut on said entry component when an electric cable extends through the gland with a conductive part being exposed within said middle nut, subjects said continuity member to axial pressure causing said region of reduced strength to fold inwardly whereby said bridge portions are displaced towards and engage the conductive part to provide at least one electrical continuity contact within said middle nut.

2. A gland according to claim 1 wherein said continuity member is made of a conductive metal.

3. A gland according to claim 2 wherein said metal is selected from the group consisting of copper, copper alloy, steel and aluminum.

4. A gland according to claim 2 wherein said metal is plated or coated.

5. A gland according to claim 1 wherein said continuity member is formed from e strip which is rolled to form a sleeve.

6. A gland according to claim 1 wherein said continuity member includes a central creasing about which said bridge portions are designed to fold when said axial pressure is applied to said continuity member.

7. A gland according to claim 1 wherein said apertures are elongate so as to extend between opposed ends of said continuity member.

8. A glad according to claim 1 wherein said continuity member is strengthened by a peripheral upstand or rolled edge at each of said opposed ends.

9. A gland according to claim 1 including a hardenable filler compound disposable within said entry component separate from said continuity member.

10. A gland according to claim 1 including a stop washer located in said entry component for engagement with the conductive part of the cable.

11. A method of assembling an electric cable termination gland comprising the steps of locating a tail nut and associated seal and washer on a cable, mounting a middle nut on said cable in a region where a conductive part of said cable is exposed, locating a continuity member inside said middle nut, locating an entry component on said cable in a region where at least one conductor core of said cable is exposed and engaging said middle nut with said entry component so that said continuity member is located between respective abutments on said entry component and said middle nut, and tightening said middle nut on said entry component so that said continuity member is subjected to axial pressure causing a middle region of said continuity member of reduced strength formed by a series of discrete bridge portions separated by spaced apart apertures to fold inwardly to bring said bridge portions into electrical contact with said exposed conductive part of the cable within said middle nut.

12. A method according to claim 11 including the step of surrounding said at least one conductor core within said entry component with a filler compound separate from said continuity member.

13. A method according to claim 12 further comprising the step of confining said filler compound in a chamber formed by at least one pot received within said entry component separate from said continuity member.

14. A method according to claim 11 including the step of forming said continuity member by rolling a metal strip into a ring-like sleeve.

15. A method according to claim 14 including the step of forming said apertures prior to rolling said strip into said sleeve.

16. A method according to claim 15 including the step of forming a linear crease across said bridge portions prior to rolling said strip into said sleeve.

* * * * *